United States Patent
Kernen et al.

(10) Patent No.: US 12,308,952 B2
(45) Date of Patent: May 20, 2025

(54) COMPANION METADATA FOR PRECISION TIME PROTOCOL (PTP) HARDWARE CLOCK

(71) Applicant: MELLANOX TECHNOLOGIES, LTD., Yokneam (IL)

(72) Inventors: Thomas Kernen, Russin (CH); Dotan David Levi, Kiryat Motzkin (IL); Bar Or Shapira, Tel Aviv (IL); Georgi Mihaylov Chalakov, Duvall, WA (US); Aviad Itzhak Raveh, Hofit (IL)

(73) Assignee: MELLANOX TECHNOLOGIES, LTD., Yokneam (IL)

( * ) Notice: Subject to any disclaimer, the term of this patent is extended or adjusted under 35 U.S.C. 154(b) by 141 days.

(21) Appl. No.: 17/858,236

(22) Filed: Jul. 6, 2022

(65) Prior Publication Data

US 2024/0014916 A1     Jan. 11, 2024

(51) Int. Cl.
*H04J 3/06*     (2006.01)
(52) U.S. Cl.
CPC ................... *H04J 3/0697* (2013.01)
(58) Field of Classification Search
CPC .................................... H04J 3/0697
See application file for complete search history.

(56) References Cited

U.S. PATENT DOCUMENTS

| | | |
|---|---|---|
| 5,392,421 A | 2/1995 | Lennartsson |
| 5,402,394 A | 3/1995 | Turski |
| 5,416,808 A | 5/1995 | Witsman et al. |
| 5,491,792 A | 2/1996 | Grisham et al. |
| 5,564,285 A | 10/1996 | Jurewicz et al. |
| 5,592,486 A | 1/1997 | Lo et al. |
| 5,896,524 A | 4/1999 | Halstead, Jr. et al. |
| 6,055,246 A | 4/2000 | Jones |
| 6,084,856 A | 7/2000 | Simmons et al. |
| 6,144,714 A | 11/2000 | Bleiweiss et al. |
| 6,199,169 B1 | 3/2001 | Voth |
| 6,289,023 B1 | 9/2001 | Dowling et al. |
| 6,449,291 B1 | 9/2002 | Burns et al. |
| 6,535,926 B1 | 3/2003 | Esker |

(Continued)

FOREIGN PATENT DOCUMENTS

| | | |
|---|---|---|
| CN | 106817183 | 6/2017 |
| CN | 108829493 | 11/2018 |

(Continued)

OTHER PUBLICATIONS

U.S. Appl. No. 17/359,667, filed Jun. 28, 2021.

(Continued)

*Primary Examiner* — Saad A. Waqas
(74) *Attorney, Agent, or Firm* — Sheridan Ross P.C.

(57) ABSTRACT

System, methods, and devices for sharing time information between machines are provided. In one example, a system includes a Precision Time Protocol (PTP) Hardware Clock (PHC) and an application. The application receives time information from the PHC along with contextual metadata associated with the time information, analyzes the contextual metadata associated with the time information, and determines a context in which the PHC is disciplined. The context in which the PHC is disciplined may control a manner in which the application uses the time information.

21 Claims, 3 Drawing Sheets

(56) References Cited

U.S. PATENT DOCUMENTS

| | | |
|---|---|---|
| 6,556,638 B1 | 4/2003 | Blackburn |
| 6,918,049 B2 | 7/2005 | Lamb et al. |
| 7,111,184 B2 | 9/2006 | Thomas, Jr. et al. |
| 7,191,354 B2 | 3/2007 | Purho |
| 7,245,627 B2 | 7/2007 | Goldenberg |
| 7,254,646 B2 | 8/2007 | Aguilera et al. |
| 7,334,124 B2 | 2/2008 | Pham et al. |
| 7,412,475 B1 | 8/2008 | Govindarajalu |
| 7,440,474 B1 | 10/2008 | Goldman et al. |
| 7,447,975 B2 | 11/2008 | Riley |
| 7,483,448 B2 | 1/2009 | Bhandari |
| 7,496,686 B2 | 2/2009 | Coyle |
| 7,535,933 B2 | 5/2009 | Zerbe et al. |
| 7,623,552 B2 | 11/2009 | Jordan et al. |
| 7,636,767 B2 | 12/2009 | Lev-Ran et al. |
| 7,650,158 B2 | 1/2010 | Indirabhai |
| 7,656,751 B2 | 2/2010 | Rischar et al. |
| 7,750,685 B1 | 7/2010 | Bunch et al. |
| 7,904,713 B1 | 3/2011 | Zajkowski et al. |
| 7,941,684 B2 | 5/2011 | Serebrin et al. |
| 8,065,052 B2 | 11/2011 | Fredriksson et al. |
| 8,341,454 B1 | 12/2012 | Kondapalli |
| 8,370,675 B2 | 2/2013 | Kagan |
| 8,407,478 B2 | 3/2013 | Kagan et al. |
| 8,607,086 B2 | 12/2013 | Cullimore |
| 8,699,406 B1 | 4/2014 | Charles et al. |
| 8,824,903 B2 | 9/2014 | Christensen |
| 8,879,552 B2 | 11/2014 | Zheng et al. |
| 8,930,647 B1 | 1/2015 | Smith |
| 9,344,265 B2 | 5/2016 | Karnes |
| 9,397,960 B2 | 7/2016 | Arad et al. |
| 9,753,854 B1 | 9/2017 | Bao |
| 9,942,025 B2 | 4/2018 | Bosch et al. |
| 9,979,998 B1 | 5/2018 | Pogue et al. |
| 10,027,601 B2 | 7/2018 | Narkis et al. |
| 10,054,977 B2 | 8/2018 | Mikhalov et al. |
| 10,095,543 B1 | 10/2018 | Griffin et al. |
| 10,148,258 B2 | 12/2018 | Carlson et al. |
| 10,164,759 B1 | 12/2018 | Volpe |
| 10,320,646 B2 | 6/2019 | Mirsky et al. |
| 10,515,045 B1 | 12/2019 | Mattina |
| 10,637,776 B2 | 4/2020 | Iwasaki |
| 10,727,966 B1 | 7/2020 | Izenberg et al. |
| 10,778,361 B1 | 9/2020 | Almog et al. |
| 10,778,406 B2 | 9/2020 | Gaist et al. |
| 10,841,243 B2 | 11/2020 | Levi et al. |
| 10,879,910 B1 | 12/2020 | Franck et al. |
| 10,887,077 B1 | 1/2021 | Ivry |
| 11,070,214 B1 | 7/2021 | Franck et al. |
| 11,070,224 B1 | 7/2021 | Faig et al. |
| 11,070,304 B1 | 7/2021 | Levi et al. |
| 11,128,500 B1 | 9/2021 | Mentovich et al. |
| 11,157,433 B2 | 10/2021 | Lederman et al. |
| 11,240,079 B1 | 2/2022 | Kushnir et al. |
| 11,303,363 B1 | 4/2022 | Mohr et al. |
| 11,336,383 B2 | 5/2022 | Mula et al. |
| 11,368,768 B2 | 6/2022 | Bakopoulos et al. |
| 11,379,334 B1 | 7/2022 | Srinivasan et al. |
| 11,388,263 B2 | 7/2022 | Levi et al. |
| 11,476,928 B2 | 10/2022 | Levi et al. |
| 2001/0006500 A1 | 7/2001 | Nakajima et al. |
| 2002/0027886 A1 | 3/2002 | Fischer et al. |
| 2004/0096013 A1 | 5/2004 | Laturell et al. |
| 2004/0153907 A1 | 8/2004 | Gibart |
| 2005/0033947 A1 | 2/2005 | Morris et al. |
| 2005/0172181 A1 | 8/2005 | Huliehel |
| 2005/0268183 A1 | 12/2005 | Barmettler |
| 2006/0109376 A1 | 5/2006 | Chaffee et al. |
| 2007/0008044 A1 | 1/2007 | Shimamoto |
| 2007/0072451 A1 | 3/2007 | Tazawa et al. |
| 2007/0104098 A1 | 5/2007 | Kimura et al. |
| 2007/0124415 A1 | 5/2007 | Lev-Ran et al. |
| 2007/0159924 A1 | 7/2007 | Vook et al. |
| 2007/0266119 A1 | 11/2007 | Ohly |
| 2008/0069150 A1 | 3/2008 | Badt et al. |
| 2008/0225841 A1 | 9/2008 | Conway et al. |
| 2008/0285597 A1 | 11/2008 | Downey et al. |
| 2009/0257458 A1 | 10/2009 | Cui |
| 2010/0280858 A1 | 11/2010 | Bugenhagen |
| 2011/0182191 A1 | 7/2011 | Jackson |
| 2012/0063556 A1 | 3/2012 | Hoang |
| 2012/0076319 A1 | 3/2012 | Terwal |
| 2013/0039359 A1 | 2/2013 | Bedrosian |
| 2013/0045014 A1 | 2/2013 | Mottahedin et al. |
| 2013/0294144 A1 | 11/2013 | Wang et al. |
| 2013/0315265 A1 | 11/2013 | Webb, III et al. |
| 2014/0153680 A1 | 6/2014 | Garg et al. |
| 2014/0185632 A1 | 7/2014 | Steiner et al. |
| 2014/0253387 A1 | 9/2014 | Gunn et al. |
| 2014/0321285 A1 | 10/2014 | Chew et al. |
| 2015/0078405 A1 | 3/2015 | Roberts |
| 2015/0092793 A1 | 4/2015 | Aweya |
| 2015/0127978 A1 | 5/2015 | Cui et al. |
| 2015/0318941 A1 | 11/2015 | Zheng et al. |
| 2016/0072602 A1 | 3/2016 | Earl et al. |
| 2016/0110211 A1 | 4/2016 | Karnes |
| 2016/0277138 A1 | 9/2016 | Garg et al. |
| 2016/0285574 A1 | 9/2016 | White et al. |
| 2016/0315756 A1 | 10/2016 | Tenea et al. |
| 2017/0005903 A1 | 1/2017 | Mirsky et al. |
| 2017/0017604 A1 | 1/2017 | Chen et al. |
| 2017/0214516 A1 | 7/2017 | Rivaud et al. |
| 2017/0302392 A1 | 10/2017 | Farra et al. |
| 2017/0331926 A1 | 11/2017 | Raveh et al. |
| 2017/0359137 A1 | 12/2017 | Butterworth et al. |
| 2018/0059167 A1 | 3/2018 | Sharf et al. |
| 2018/0152286 A1 | 5/2018 | Kemparaj et al. |
| 2018/0191802 A1 | 7/2018 | Yang et al. |
| 2018/0227067 A1 | 8/2018 | Hu et al. |
| 2018/0255332 A1* | 9/2018 | Heusser ................ H04H 20/18 |
| 2019/0007189 A1 | 1/2019 | Hossain et al. |
| 2019/0014526 A1 | 1/2019 | Bader et al. |
| 2019/0089615 A1 | 3/2019 | Branscomb et al. |
| 2019/0149258 A1 | 5/2019 | Araki et al. |
| 2019/0158909 A1 | 5/2019 | Kulkarni et al. |
| 2019/0196563 A1 | 6/2019 | Lai |
| 2019/0273571 A1 | 9/2019 | Bordogna et al. |
| 2019/0319729 A1 | 10/2019 | Leong et al. |
| 2019/0349392 A1 | 11/2019 | Wetterwald et al. |
| 2019/0379714 A1 | 12/2019 | Levi et al. |
| 2020/0162234 A1 | 5/2020 | Almog et al. |
| 2020/0169379 A1 | 5/2020 | Gaist et al. |
| 2020/0235905 A1 | 7/2020 | Su et al. |
| 2020/0304224 A1 | 9/2020 | Neugeboren |
| 2020/0331480 A1 | 10/2020 | Zhang et al. |
| 2020/0344333 A1 | 10/2020 | Hawari et al. |
| 2020/0396050 A1 | 12/2020 | Perras et al. |
| 2020/0401434 A1 | 12/2020 | Thampi et al. |
| 2021/0141413 A1 | 5/2021 | Levi et al. |
| 2021/0218431 A1 | 7/2021 | Narayanan et al. |
| 2021/0243140 A1 | 8/2021 | Levi et al. |
| 2021/0288785 A1 | 9/2021 | Faig et al. |
| 2021/0297151 A1 | 9/2021 | Levi et al. |
| 2021/0297230 A1 | 9/2021 | Dror et al. |
| 2021/0318978 A1 | 10/2021 | Hsung |
| 2021/0328900 A1 | 10/2021 | Sattinger et al. |
| 2021/0392065 A1 | 12/2021 | Sela et al. |
| 2021/0409031 A1 | 12/2021 | Ranganathan et al. |
| 2022/0006606 A1 | 1/2022 | Levi et al. |
| 2022/0021393 A1 | 1/2022 | Ravid et al. |
| 2022/0066978 A1 | 3/2022 | Mishra |
| 2022/0086105 A1 | 3/2022 | Levi et al. |
| 2022/0116373 A1* | 4/2022 | Soo ...................... H04L 63/108 |
| 2022/0173741 A1 | 6/2022 | Ravid et al. |
| 2022/0191275 A1 | 6/2022 | Levi et al. |
| 2022/0121691 A1 | 7/2022 | Mentovich et al. |
| 2022/0224500 A1 | 7/2022 | Mula et al. |
| 2022/0311530 A1* | 9/2022 | Snowdon .............. H04J 3/0664 |
| 2022/0342086 A1 | 10/2022 | Yoshida |
| 2022/0352998 A1 | 11/2022 | Levi et al. |
| 2022/0357763 A1 | 11/2022 | Levy et al. |

(56) References Cited

U.S. PATENT DOCUMENTS

2022/0360423 A1 11/2022 Levi et al.
2022/0385598 A1 12/2022 Pismenny et al.

FOREIGN PATENT DOCUMENTS

| | | | | |
|---|---|---|---|---|
| EP | 1215559 | 9/2007 | | |
| EP | 2770678 | 8/2014 | | |
| JP | 2011-091676 | 5/2011 | | |
| JP | 2023546249 A | * 11/2023 | | |
| TW | 498259 | 8/2002 | | |
| WO | WO 2012/007276 | 1/2012 | | |
| WO | WO-2012007276 A1 | * 1/2012 | ............ | H04J 3/0641 |
| WO | WO 2013/124782 | 8/2013 | | |
| WO | WO 2013/143112 | 10/2013 | | |
| WO | WO 2014/029533 | 2/2014 | | |
| WO | WO-2018067817 A1 | * 4/2018 | ............... | G06F 1/14 |
| WO | WO-2020070552 A1 | * 4/2020 | ............ | H04L 67/02 |

OTHER PUBLICATIONS

U.S. Appl. No. 17/520,674, filed Nov. 7, 2021.
U.S. Appl. No. 17/534,776, filed Nov. 24, 2021.
U.S. Appl. No. 17/549,949, filed Dec. 14, 2021.
U.S. Appl. No. 17/578,115, filed Jan. 18, 2022.
U.S. Appl. No. 17/579,630, filed Jan. 20, 2022.
U.S. Appl. No. 17/582,058, filed Jan. 24, 2022.
U.S. Appl. No. 17/667,600, filed Feb. 9, 2022.
U.S. Appl. No. 17/868,841, filed Jul. 20, 2022.
U.S. Appl. No. 17/871,937, filed Jul. 24, 2022.
U.S. Appl. No. 17/885,604, filed Aug. 11, 2022.
"Can Altera GX/GT/GZ device high speed transceivers handle Spread Spectrum Clocking (SSC), as required by PCIe or SATA/SAS protocols?" Intel Corporation, Sep. 11, 2012, 2 pages [retrieved online Oct. 26, 2022 from: www.intel.com/content/www/us/en/support/programmable/articles/000079683.html].
"Distribution of timing information through packet networks," International Telecommunication Union, Aug. 2017, Recommendation ITU-T G.8264/Y.1364, 42 pages.
"How to test 1PPS on Mellanox Adapters" Mellanox Technologies, 2019, 7 pages [retrieved online Oct. 26, 2022 from community.mellanox.com/s/article/How-To-Test-1PPS-on-Mellanox-Adapters].
"IEEE 1588 Primer," ip-clock.com, pp. 1-3, May 1, 2017 (retrieved online Oct. 26, 2022 from web.archive.org/web/20170501192647/http://ip-clock.com/ieee-1588-primer/).
"LMK05318 Ultra-Low Jitter Network Synchronizer Clock With Two Frequency Domains," Texas Instruments, Dec. 2018, SNAS771A, 86 pages [retrieved online Oct. 26, 2022 from: www.ti.com/lit/ds/snas771a/snas771a.pdf?ts=1666725415863].
"PCI Express 3.1 JITTER Requirements" Skywork Solutions Inc., Sep. 2021, AN562, 16 pages.
"Precision Time Protocol," CISCO, Jul. 30, 2020, 52 pages [retrieved online Oct. 26, 2022 from: www.cisco.com/c/en/us/td/docs/dcn/aci/apic/5x/system-management-configuration/cisco-apic-system-management-configuration-guide-52x/m-precision-time-protocol.pdf].
"Timing and synchronization aspects in packet networks" International Telecommunication Union, Aug. 2019, Recommendation ITU-T G.8261/Y.1361, 120 pages.
"Timing characteristics of synchronousequipment slave clock," International Telecommunication Union, Nov. 2018, Recommendation ITU-T G.8262/Y.1362, 44 pages.
"Timing characteristics of telecom boundary clocks and telecom time slave clocks" International Telecommunication Union, Jan. 2017, Recommendation ITU-T G.8273.2/Y.1368.2, 50 pages.
Dlugy-Hegwer et al., "Designing and Testing IEEE 1588 Timing Networks", Symmetricom, pp. 1-10, Jan. 2007.
IEEE Standard 1588-2002, "IEEE Standard for a Precision Clock Synchronization Protocol for Networked Measurement and Control Systems", IEEE Instrumentation and Measurement Society, pp. 1-154, Nov. 8, 2002.
IEEE Standard 1588™-2008: "IEEE Standard for a Precision Clock Synchronization Protocol for Networked Measurement and Control Systems", IEEE Instrumentation and Measurement Society, Revision of IEEE Standard 1588-2002, USA, pp. 1-289, Jul. 24, 2008.
Infiniband Architecture: Specification vol. 1, pp. 1-1727, Release 1.2.1, Infiniband Trade Association, Nov. 2007.
Lu et al., "A Fast CRC Update Implementation", Computer Engineering Laboratory, Electrical Engineering Department, pp. 113-120, Oct. 8, 2003.
Mellanox Technologies, "Mellanox ConnectX IB: Dual-Port InfiniBand Adapter Cards with PCI Express 2.0", pp. 1-2, USA, year 2008.
Weibel et al., "Implementation and Performance of Time Stamping Techniques", 2004 Conference on IEEE 1588, Sep. 28, 2004, 15 pages.
Weibel, H., "High Precision Clock Synchronization according to IEEE 1588 Implementation and Performance Issues", Zurich University of Applied Sciences, pp. 1-9, Jan. 17, 2005.
WIKIPEDIA- "Precision Time Protocol," WIKIPEDIA, Aug. 24, 2019, 10 pages [retrieved online Oct. 26, 2022 from: en.wikipedia.org/w/index.php?title=Precision_Time_Protocol&oldid=912308324].
Working Draft Project American National Standard T10/1799-D, "Information Technology—SCSI Block Commands—3 (SBC-3)", pp. 1-220, Revision 19, May 29, 2009.
Zhang et al. "TI BAW technology enables ultra-low jitter clocks for high-speed networks," Texas Instruments, Feb. 2019, White Paper, SNOAA34, 11 pages [retrieved online from: www.ti.com/lit/wp/snoaa34/snoaa34.pdf?ts=1630651534227&ref_url=https%25253A%25252F%25252Fwww.google.com%25252F].
Corbett et al. "Spanner: Google's Globally Distributed Database," ACM Transactions on Computer Systems, Aug. 2013, vol. 31, No. 3, Article 8, 22 pages.

* cited by examiner

COMPANION METADATA FOR PRECISION TIME PROTOCOL (PTP) HARDWARE CLOCK

FIELD OF THE DISCLOSURE

The present disclosure is generally directed toward networking and, in particular, toward network synchronization and consumption of time information shared between network-connected devices.

BACKGROUND

Standard protocols, such as the Precision Time Protocol (PTP) or IEEE 1588, have been developed to facilitate the sharing of time/synchronization information over a packet-switched network. PTP has evolved as the primary protocol for sharing precision time, phase, and frequency information with packets.

Applications in computing devices usually consume time information derived from a disciplined PTP Hardware Clock (PHC). Consumption of the time information normally occurs via the disciplined Real-Time Clock of the host from the PHC or by directly reading from a PHC. Inaccuracies of time information consumed by the application may result in poor application performance or undesired consequences.

BRIEF SUMMARY

Embodiments of the present disclosure aim to improve application performance by enabling applications to access higher-order contextual information associated with time information shared between network devices. The application may be enabled to receive some contextual information associated with the time being used within the PTP stack. As an example, the application may be configured to access a PTP dataset that is currently being used, which provides a first order of contextual information. Unfortunately, this first order of contextual information doesn't provide a full view of how the PHC is being disciplined. For example, environmental changes, such as oscillator temperature variations, or operational changes, such as when the PHC was last disciplined, cannot be captured in the first order of contextual information. Embodiments of the present disclosure enable an application to access detailed contextual information, which helps the application determine a true context in which the PHC is disciplined. Without a deeper understanding of the context in which the PHC was disciplined, the application is left to assume that the time information is good enough, without making such an evaluation for itself. This type of assumption can lead to poor application performance or undesired consequences.

Illustratively, and without limitation, a computing device is disclosed herein to include: an interface that receives time information from a Precision Time Protocol (PTP) Hardware Clock (PHC) of a network device along with contextual metadata associated with the time information; a processor; and memory coupled with the processor, where the memory includes at least one application that is executable by the processor and, upon execution by the processor: analyzes the contextual metadata associated with the time information; and determines a context in which the PHC is disciplined.

In some embodiments, the application, upon execution by the processor, determines a reliability of the PHC based on the context in which the PHC is disciplined.

In some embodiments, the application, upon execution by the processor, discards the time information upon determining that the reliability of the PHC fails to meet at least a predetermined reliability threshold.

In some embodiments, the contextual metadata describes an operational change of the network device.

In some embodiments, the contextual metadata describes an oscillator temperature variation of the network device.

In some embodiments, the contextual metadata describes an elapsed time since the PHC of the network device has been disciplined.

In some embodiments, the contextual metadata is received in a packet that also contains the time information.

In some embodiments, the contextual metadata is received in a first packet and wherein the time information is received in a second packet.

In some embodiments, the application, upon execution by the processor, makes a routing decision based on the time information and based upon the context in which the PHC is disciplines meets at least one contextual criterion.

In some embodiments, the time information describes at least one of time, frequency, and phase.

In another example, a network device is described that includes: a Precision Time Protocol (PTP) Hardware Clock (PHC); and an interface that transmits, to a computing device, time information derived from the PHC along with contextual metadata that enables an application of the computing device to determine a context in which the PHC is disciplined.

In some embodiments, the time information and the contextual metadata are transmitted via the interface via a common packet.

In some embodiments, the time information is transmitted via a first packet and wherein the contextual metadata is transmitted via a second packet.

In some embodiments, the contextual metadata describes an operational change of the network device.

In some embodiments, the contextual metadata describes an oscillator temperature variation.

In some embodiments, the contextual metadata describes an elapsed time since the PHC has been disciplined.

In some embodiments, the time information describes at least one of time, frequency, and phase.

In another example, a system is disclosed that includes: a Precision Time Protocol (PTP) Hardware Clock (PHC); and an application that receives time information from the PHC along with contextual metadata associated with the time information, analyzes the contextual metadata associated with the time information, and determines a context in which the PHC is disciplined.

In some embodiments, the time information and the contextual metadata are received at the application in a common packet.

In some embodiments, the PHC belongs to a network device and wherein the application belongs to a computing device that communicates with the network device via a communication network.

In some embodiments, the contextual metadata describes at least one of: an operational change of the network device, an oscillator temperature variation, and an elapsed time since the PHC has been disciplined.

In some embodiments, the time information describes at least one of time, frequency, and phase.

Additional features and advantages are described herein and will be apparent from the following Description and the figures.

BRIEF DESCRIPTION OF THE SEVERAL VIEWS OF THE DRAWINGS

The present disclosure is described in conjunction with the appended figures, which are not necessarily drawn to scale.

DETAILED DESCRIPTION

Figure 1:
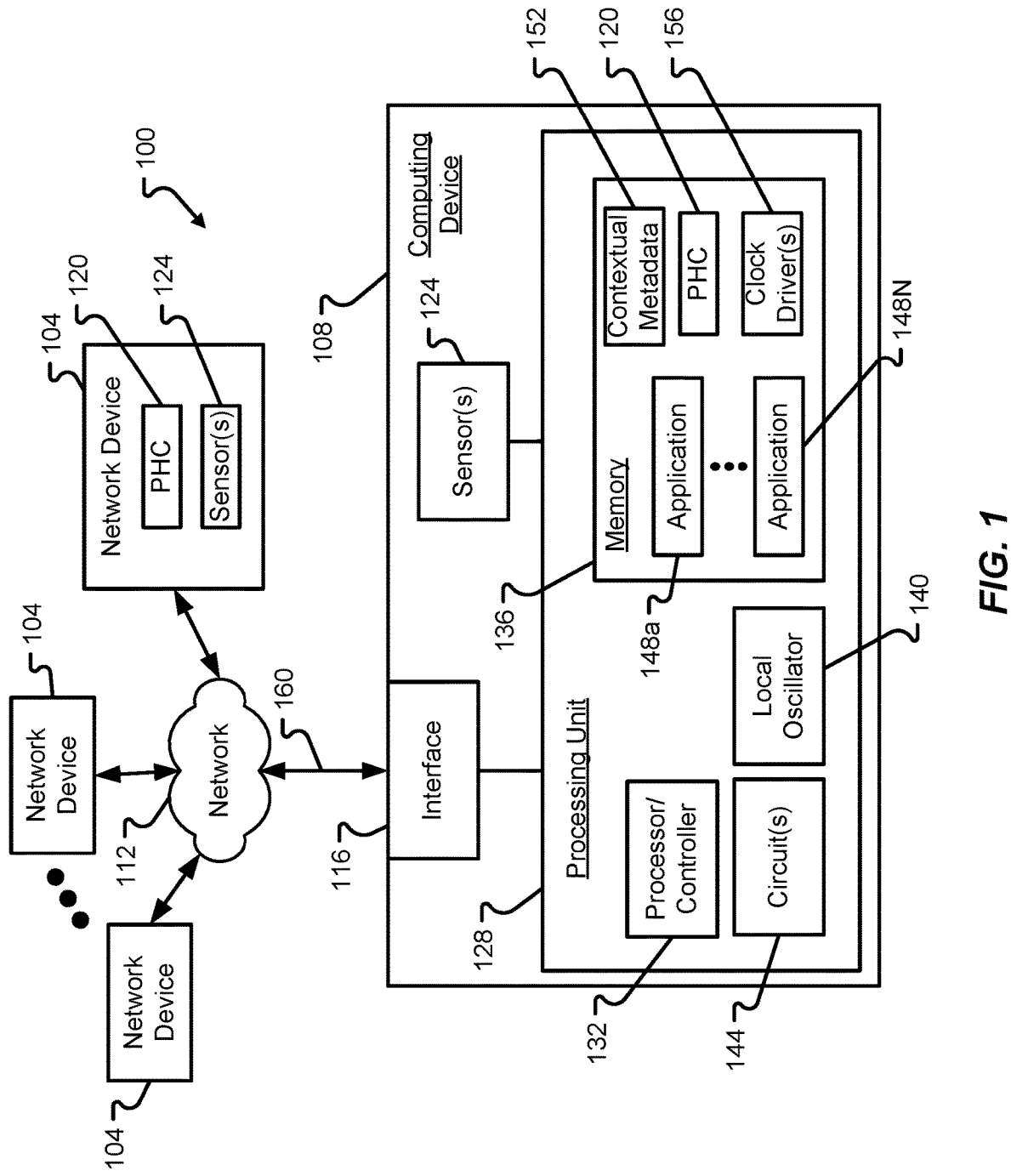
FIG. 1 is a block diagram illustrating a computing system in accordance with at least some embodiments of the present disclosure.

The ensuing description provides embodiments only, and is not intended to limit the scope, applicability, or configuration of the claims. Rather, the ensuing description will provide those skilled in the art with an enabling description for implementing the described embodiments. It being understood that various changes may be made in the function and arrangement of elements without departing from the spirit and scope of the appended claims.

It will be appreciated from the following description, and for reasons of computational efficiency, that the components of the system can be arranged at any appropriate location within a distributed network of components without impacting the operation of the system.

Furthermore, it should be appreciated that the various links connecting the elements can be wired, traces, or wireless links, or any appropriate combination thereof, or any other appropriate known or later developed element(s) that is capable of supplying and/or communicating data to and from the connected elements. Transmission media used as links, for example, can be any appropriate carrier for electrical signals, including coaxial cables, copper wire and fiber optics, electrical traces on a Printed Circuit Board (PCB), or the like.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means: A alone, B alone, C alone, A and B together, A and C together, B and C together, or A, B and C together.

The term "automatic" and variations thereof, as used herein, refers to any appropriate process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine," "calculate," and "compute," and variations thereof, as used herein, are used interchangeably and include any appropriate type of methodology, process, operation, or technique.

Various aspects of the present disclosure will be described herein with reference to drawings that are schematic illustrations of idealized configurations.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and this disclosure.

As used herein, the singular forms "a," "an," and "the" are intended to include the plural forms as well, unless the context clearly indicates otherwise. It will be further understood that the terms "comprise," "comprises," and/or "comprising," when used in this specification, specify the presence of stated features, integers, steps, operations, elements, and/or components, but do not preclude the presence or addition of one or more other features, integers, steps, operations, elements, components, and/or groups thereof. The term "and/or" includes any and all combinations of one or more of the associated listed items.

Figure 2:
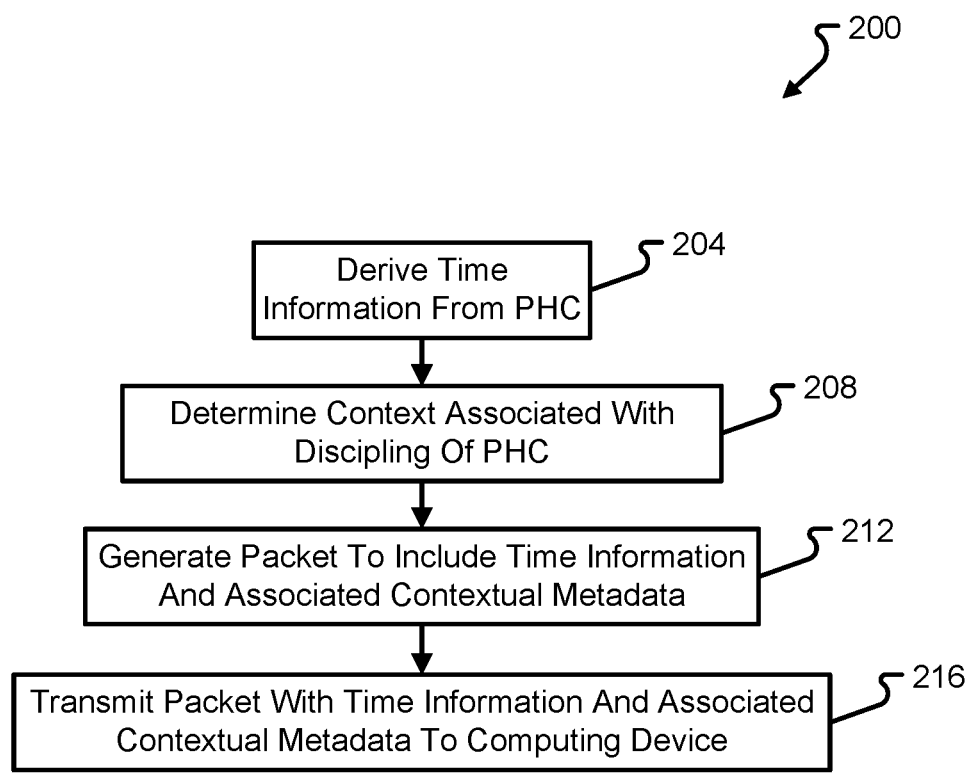
FIG. 2 is a flow diagram illustrating a method of generating and sharing time information in accordance with at least some embodiments of the present disclosure.
Figure 3:
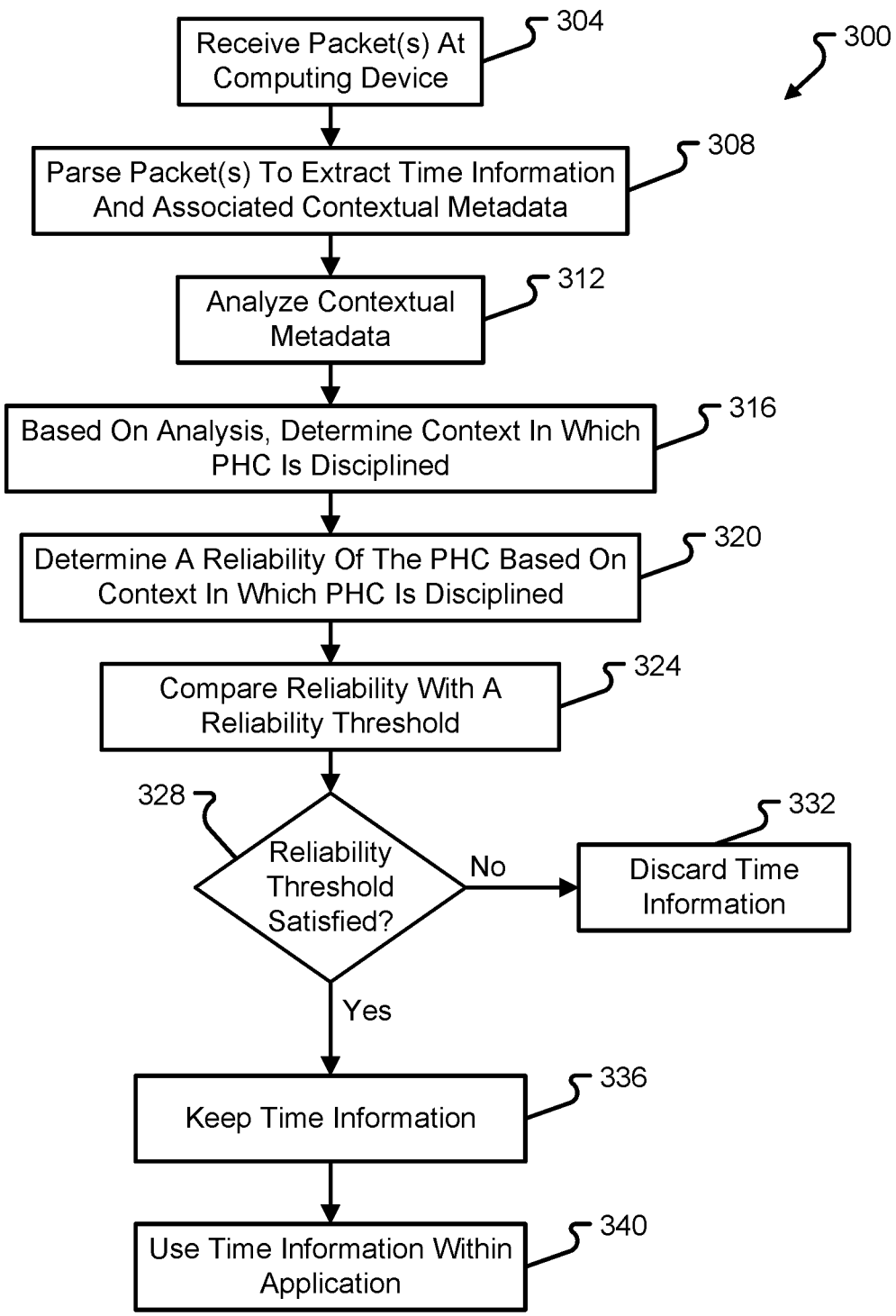
FIG. 3 is a flow diagram illustrating a method of consuming and processing time information in accordance with at least some embodiments of the present disclosure.

Referring now to FIGS. 1-3, various systems and methods for time information processing will be described in accordance with at least some embodiments of the present disclosure. As will be described in more detail herein, network devices that synchronize clocks with one another may share time information along with contextual metadata. By including a contextual metadata channel alongside reading from a PHC, an application of a computing device is provided more detailed contextual information regarding the PHC. The additional contextual information allows the application to determine a context in which the PHC was disciplined and, therefore, increase its understanding of the overall reliability of the time transfer.

Referring initially to FIG. 1, an illustrative computing system 100 is shown in which a network device 104 is configured to communicate with a computing device 108. While illustrated as different types of devices, it should be appreciated that the network device 104 and computing device 108 may be of the same or similar type of device. For instance, the devices 104, 108 may both correspond to network devices (e.g., devices used within a communication network 112) for routing packets between machines connected to the communication network 112. Alternatively, the devices 104, 108 both correspond to computing devices that include one or more applications 148 that consume time information. It should also be appreciated that a device can behave like or be considered a network device 104 and a computing device 108 without departing from the scope of the present disclosure. The separate labelling of a network device 104 from a computing device 108 is intended to help clearly illustrate the features disclosed herein.

While only a single computing device 108 is depicted, it should be appreciated that the system 100 may include multiple computing devices 108. Likewise, the number of network devices 104 in the system 100 may be greater or fewer than the number of network devices 104 illustrated.

The network device 104 may include any type of device used to facilitate machine-to-machine communications. The network device 104 may include one or more of a switch, a server, a Network Interface Controller (NIC), a network adapter, an Ethernet card, an expansion card, a Local Area Network (LAN) adapter, a physical network interface, a wireless router, a network border device, or the like. Alternatively or additionally, the network device 104 may be referred to as a data transfer device and, in some embodiments, may correspond to a device that forms the communication network 112.

The network device 104 is shown to include a PHC 120 and one or more sensors 124. As will be described herein, the network device 104 may be configured to synchronize its PHC 120 with PHCs 120 of other devices 104, 108 connected to the communication network 112. In particular, the network device 104 may utilize a synchronization/synchronization process as described in IEEE 1588, for instance, to coordinate clocks of other devices 104, 108 connected to the communication network 112.

In some embodiments, the network device 104 may also include one or more sensor(s) 124 that monitor environmental and/or operational circumstances surrounding the network device 104 and the conditions that may describe a context in which the PHC 120 is disciplined. The sensor(s) 124 may include temperature sensors, pressure sensors, air speed sensors, dust sensors, vibration sensors, accelerometers, strain gauges, optical sensors, proximity sensors, Infrared (IR) sensors, etc. Indeed, the sensor(s) 124 used to determine contextual information can vary and should not be limited to any particular sensor or sensor type.

As will be described in further detail herein, the network device 104, when sharing time information among other devices 104, 108 connected to the communication network 112, may share the time information, frequency information, and/or phase information along with contextual metadata 152 associated with the time/frequency/phase information. The contextual metadata 152 may describe a context in which the PHC 120 was disciplined. When other devices 104, 108 receive the time/frequency/phase information from a network device 104, the other devices may store the time/frequency/phase information along with the contextual metadata 152. Thus, when other devices 104, 108 synchronize/adjust their clocks, the contextual metadata 152 associated with the time/frequency/phase information used for such a synchronization can be stored for later reference. For ease of discussion and understanding, the term time information will be used herein to refer to any combination of time, frequency, and phase information.

In some embodiments, PHCs 120 of many devices 104, 108 may be synchronized and the context associated with the time information can include context for one, some, or all of the machines involved in the synchronization. In some embodiments, the contextual metadata 152 may describe environmental and/or operational circumstances surrounding the device 104, 108 acting as the master controller from which other devices 104, 108 are synchronizing their PHCs 120. Alternatively or additionally, the contextual metadata 152 may describe environmental and/or operational circumstances surrounding the device housing the PHC 120 from which time information is read. For example, a computing device 108 may synchronize its PHC 120 to the PHC 120 of the network device 104, if the network device 104 is acting as the master controller. When an application 148 of the computing device 108 reads time information from the PHC 120, the computing device 108 may also obtain contextual metadata 152 associated with the disciplining of the PHC 120. The contextual metadata 152 obtained by the application 148 may include any contextual metadata describing the context in which the PHC 120 was disciplined, which may include information read by a sensor 124 of the computing device 108, information read by a sensor 124 of the network device 104, information describing a last time the PHC 120 of the computing device 108 was disciplined, information describing an elapsed time since the PHC 120 of the computing device 108 was disciplined, information describing a last time the PHC 120 of the network device 104 was disciplined, information describing an elapsed time since the PHC 120 of the network device 104 was disciplined, information describing a smearing of a leap second, combinations thereof, and the like. With respect to the smearing of a leap second, some implementations add the second when required, others due to operational impact will actually smear the addition (or removal) of the leap second over a period of time (e.g., +/−12 h from the event itself). The device retrieving time from the PHC 120 may benefit from knowing whether leap second(s) are being smeared (or not). Hence, such information describing whether smearing of leap seconds is occurring (or not) may be provided as part of the contextual metadata 152.

While the contextual metadata 152 is shown as being stored in memory 136 of the computing device 108, it should be appreciated that the network device(s) 104 may also store a version of contextual metadata 152. Contextual metadata 152 may be shared among devices 104, 108 alongside time information (e.g., encoded in packets also containing the time information). Alternatively, contextual metadata 152 may be shared among devices 104, 108 out of band from time information (e.g., encoded in different packets from the packets containing time information). The contextual metadata 152 may be associated with the time information such that when the time information is obtained along with contextual metadata 152, the contextual metadata 152 can be analyzed to determine a context in which the PHC 120 is disciplined. As will be described in further detail below, in some embodiments, an application 148 of a computing device 108 may obtain time information from the PHC 120 of the computing device 108. When the time information is retrieved by the application 148, the application 148 may also retrieve the contextual metadata 152 associated with the time information. The application 148 may then analyze the contextual metadata 152 to determine a context in which the PHC 120 was disciplined. In some embodiments, the application 148 may decide to use, keep, or discard the time information depending upon the context in which the PHC 120 is disciplined. For example, the application 148 may determine a reliability of the PHC 120 based on the context in which the PHC 120 is disciplined, based on the analysis of the contextual metadata 152.

In some embodiments, the network device 104 and/or computing device 108 is provided with a processing unit 128 that is configured to perform data processing functions within the device 104, 108. As an example, the network device 104 may include a processing unit 128 in the form of a Central Processing Unit (CPU), Graphics Processing Unit (GPU), or Data Processing Unit (DPU), which may enable the network device 104 to perform data transfer functions, packet routing functions, etc. As another example, the computing device 108 may include a processing unit 128 in the form of a CPU, GPU, DPU, or the like, which may enable the computing device 108 to perform data processing functions, packet routing functions, etc.

The network device 104 and computing device 108 may each be connected to the communication network 112 via a device interface 116. The device interface 116 may enable communications between the device 104, 108 and the communication network 112 via a communication link 160. The communication link 160 may include a wired connection, a wireless connection, an electrical connection, etc. In some embodiments, the communication link 160 may facilitate the transmission of data packets between the network device 104 and the computing device 108 via one or more of electrical signals, optical signals, combinations thereof, and the like. It should be appreciated that the communication link 160 may include, without limitation, a PCIe link, a Compute Express Link (CXL) link, a high-speed direct GPU-to-GPU link (e.g., an NVlink), etc.

The computing device 108 may correspond to any suitable type of device used for receiving and processing data within the computing system 100. Non-limiting examples of a computing device 108 include a Personal Computer (PC), a smartphone, a host device, a switch, a server, a NIC, a network adapter, an Ethernet card, an expansion card, a LAN adapter, a physical network interface, a wireless router, a network border device, or the like.

As noted above, the computing device 108 may include a processing unit 128 that is coupled with the interface 116 and with one or more sensor(s) 124 of the computing device 108. Components that may be included as part of the processing unit 128 include, without limitation, a processor/controller 132, memory 136, a local oscillator 140, and/or one or more other circuits 144.

The memory 136 may include instructions for execution by the processor 132 that, when executed by the processor 132, enable the processing unit 128 to perform any number of tasks (e.g., data routing tasks, data processing tasks, etc.). In some embodiments, the memory 136 may include one or more applications 148*a*-N that are executable by the processor 132. The number of applications 148 provided in memory 136 may range from 1 to N, where N corresponds to an integer value. The applications 148*a*-N may request and utilize time information from the PHC 120. In some embodiments, the request for time information may also result in the application receiving contextual metadata 152 describing a context in which the PHC 120 was disciplined.

Although depicted as separate components, the contextual metadata 152, PHC 120, and other components may be provided as part of a PTP stack. For instance, a PTP stack may be provided in memory 136 that includes the PHC 120 (or a PHC system), one or more clock drivers 156, a SyncE controller, timestamps, and other known elements of a PTP stack. Time information for the PHC 120 may be derived, at least in part, based on the local oscillator 140 and synchronization signals received from other network devices 104. In some embodiments, the computing device 108 may synchronize its PHC 120 (e.g., set time and set frequency) responsive to signals received from the networking device 104. In some embodiments, the computing device 108 may store contextual metadata 152 received from the networking device 104. The computing device 108 may further create and store its own contextual metadata 152 describing environmental and/or operational conditions surrounding the manner in which the PHC 120 of the computing device 108 has been disciplined.

As one non-limiting example, the contextual metadata 152 may describe an operational change of the network device 108 (e.g., a change in operational speed, a change in frequency, a change in traffic flows, a change in power consumption, etc.). Alternatively or additionally, the contextual metadata 152 may describe an operational change of the computing device 108 (e.g., a change in operational speed, a change in frequency, a change in traffic flows, a change in power consumption, etc.). Alternatively or additionally, the contextual metadata 152 may describe a temperature of the local oscillator 140 and/or a temperature of an oscillator at the network device 104. Such temperature information may be obtained by the one or more sensors 124. Alternatively or additionally, the contextual metadata 152 may describe an elapsed time since the PHC 120 of the network device 104 and/or computing device 108 has been disciplined. Alternatively or additionally, the contextual metadata 152 may describe a combination of the environmental and/or operational changes described above.

To the extent that the contextual metadata 152 corresponds to at least some contextual metadata received from the network device 104, the contextual metadata 152 may be transmitted in a packet that also contains the associated time information. It may also be possible to transmit the contextual metadata using a packet different from the packet used to transmit time information. Moreover, when an application 148 submits a get_time request to the PHC 120, the application 148 may also (e.g., simultaneously) request contextual metadata 152 from the PHC 120. The PHC 120 may provide the requested time information along with the contextual metadata 152.

As can be appreciated, different applications 148 may have different standards for time information. In some embodiments, a first application (e.g., application 148*a*) may have a first reliability threshold that it applies to determine if time information is useable (e.g., sufficiently reliable/accurate) by the first application. A different application (e.g., application 148N) may have a second reliability threshold (different from the first reliability threshold) that it applies to determine if time information is useable (e.g., sufficiently reliable/accurate) by the other application. Said another way, each application may apply its own reliability analysis to time information and the contextual metadata 152 associated therewith to determine if the manner in which the PHC 120 has been disciplined is reliable enough to use the time information. The applications 148*a*-N may apply the same thresholds or different thresholds without departing from the scope of the present disclosure. As can be appreciated, the way in which time information is used by an application 148*a*-N may depend upon the nature of the application itself. For instance, a packet routing application 148 may analyze the contextual metadata 152 and decide whether or not to use time information obtained from the PHC 120 as part of making a packet routing decision, based on the reliability associated with the time information. As another example, a data processing application 148 may analyze the contextual metadata 152 and decide whether or not to use time information obtained from the PHC 120 as part of processing data or performing operations with the processor 132. In the event that newly-requested time information is determined by an application 148*a*-N to not meet a reliability threshold (e.g., the time information is not reliable enough for the application's standards), then the application 148*a*-N may discard the newly-requested time information and either: (1) not perform the task until reliable time information is obtained or (2) request new time information from the PHC 120 or from a different PHC 120. As depicted and described herein, it should be appreciated that the system 100 may include, one, two, three, . . . , or more PHCs 120 and there may be cases where there are multiple disciplined clocks 156.

The one or more circuits 144 may be provided as part of the processor 132 or may be specifically configured to perform a function of the processor 132 without necessarily referencing instructions in memory 136. For instance, the circuit(s) 144 may include digital circuit components, analog circuit components, active circuit components, passive circuit components, or the like that are specifically configured to perform a particular data truncation operation and/or transmission process. The circuit(s) 144 may alternatively or additionally include switching hardware that is configurable to selectively interconnect one device interface 116 with another device interface 116 (e.g., where the computing device 108 includes a switch or a component of a switch).

Accordingly, the circuit(s) 144 may include electrical and/or optical components without departing from the scope of the present disclosure.

The processor 132 and/or circuit(s) 144 may include one or more Integrated Circuit (IC) chips, microprocessors, circuit boards, simple analog circuit components (e.g., resistors, capacitors, inductors, etc.), digital circuit components (e.g., transistors, logic gates, etc.), registers, Field Programmable Gate Arrays (FPGAs), Application Specific Integrated Circuits (ASICs), combinations thereof, and the like. It should be appreciated that the processor 132 may correspond to an optional component of the processing unit 128, especially in instances where the circuit(s) 144 provide sufficient functionality to support operations of the processing unit 128 described herein. As noted above, the processing unit 128 may correspond to a CPU, GPU, DPU, combinations thereof, and the like. Thus, while only a single processing unit 128 is shown in the computing device 108, it should be appreciated that the computing device 108 may include multiple processing units 128 without departing from the scope of the present disclosure.

The memory 136 may include any number of types of memory devices. As an example, the memory 136 may include Random Access Memory (RAM), Read Only Memory (ROM), flash memory, Electronically-Erasable Programmable ROM (EEPROM), Dynamic RAM (DRAM), buffer memory, combinations thereof, and the like.

Referring now to FIGS. 2 and 3, additional details regarding operations of components in the system 100 will be described. While certain steps of the methods will be described as being performed in a particular order and by a particular component, it should be appreciated that embodiments of the present disclosure are not so limited. Specifically, the order of operations in the various methods may be modified and any component or combination of components in the system 100 may be configured to perform some or all of the method steps depicted and described herein.

Referring to FIG. 2, a flow diagram illustrating a method 200 of generating and sharing time information will be described in accordance with at least some embodiments of the present disclosure. The method 200 begins when a device derives time information from its PHC 120 (step 204). The device may correspond to a network device 104 or a computing device 108. The time information may be derived or obtained by submitting a request to the PHC 120 or a PTP stack containing the PHC 120. The request submitted to the PHC 120 or PTP stack may be in the form of a get_time command or any other suitable request/message/command that is used to retrieve time information from a network entity or computing node.

The method 200 continues by determining a context associated with the disciplining of the PHC 120 (step 208). The determination of context may be made based on obtaining readings from one or more sensor(s) 124 at substantially the same time as deriving/obtaining the time information. The determination of context may be made based on analyzing a last time or elapsed time since the PHC 120 was disciplined. The contextual information obtained in this step may be used to create contextual metadata 152 that is associated with the time information. The association between the contextual metadata 152 and the time information may help a consumer of the time information and contextual metadata 152 determine a context in which the PHC 120 is disciplined.

The method 200 continues by generating one or more packets to include the time information and associated contextual metadata 152 (step 212). In some embodiments, the packets may be formatted for transmission across a communication network and may be encoded with both time information and contextual metadata 152. In some embodiments, the packets may be formatted for transmission within a computing device 108 or network device 104, but still may be encoded with both time information and contextual metadata 152. In some embodiments, the time information may be transmitted across a different communication channel (e.g., by using different packets) than the associated contextual metadata 152. In any event, the method 200 continues by transmitting the time information and associated contextual metadata 152 via one or more packets to the computing device 108. As noted above, an application 148 within the computing device 108 may correspond to the entity that has requested the time information, and the request may have been submitted to a PHC 120 that co-resides on the computing device 108 with the application 148. The contextual metadata 152 associated with the time information may describe an environmental and/or operational context associated with the computing device 108 or may describe an environmental and/or operational context associated with a network device 104 that is synchronizing its PHC 120 with the PHC 120 of the computing device 108.

FIG. 3 is a flow diagram illustrating a method 300 of consuming and processing time information in accordance with at least some embodiments of the present disclosure. The method 300 begins when one or more packets are received at a computing device 108 (step 304). The computing device 108 may be disciplining its PHC 120 based on instructions or time information received from a network device 104, which is transmitted via one or more packets over the communication network 112. In other embodiments, the method 300 may begin by an application 148 receiving time information and associated contextual metadata 152 from a local PHC 120 or PTP stack containing the PHC 120. In this situation, time information may not necessarily be initially received via a communication network 112.

The method 300 continues with the computing device 108 obtaining time information and associated contextual metadata (step 308). In some embodiments, this step involves parsing one or more packets received from a network device 104 to extract time information and associated contextual metadata 152. The time information may be used as part of disciplining the PHC 120 of the computing device 108, but may also be consumed at an application 148 of the computing device 108. The contextual metadata 152 may be stored in memory 136 or may be immediately consumed by the application 148 that intends to use the time information.

The method 300 continues with the application 148 analyzing the contextual metadata 152 (step 312). Again, the contextual metadata 152 being analyzed in this step may have been obtained from the PHC 120 as part of a get_time request, may have been retrieved from memory 136, or may have been included in one or more packets that also provided the time information to the application 148.

Based on the analysis of the contextual metadata 152, the application 148 may determine a context in which the PHC 120 was disciplined (step 316). Specifically, the application 148 may determine a context in which the PHC 120 of the computing device 108 and/or the network device 104 was disciplined. The determined context may then be used by the application 148 to determine a reliability of the PHC 120 and the time information obtained from the PHC 120 (step 320). More specifically, the application 148 may determine a reliability score for the PHC 120 and the time information being shared by the PHC 120 based on the contextual metadata 152 associated with the time information.

In more specific, but non-limiting examples, the application 148 may determine one or more of the following when analyzing the contextual metadata 152:

Type of correction applied to the PHC 120 (set_time\adjust_time\adjust_frequency).
    Time at which the correction was applied
    Value of the correction
    Standard Deviation (per type, per correction)
    Smearing leap second(s)
Exceeding a defined threshold (max/min, out of range)
    May be due to device tampering or environmental changes (temperature, humidity, voltage, etc.)
    Changes in the long-term stability of the oscillator 140
    Changes in correction update rate
Disciplining source for the PHC 120
    Provide the current disciplining source of the PHC 120
    Better understand if device is disciplined from, primary, secondary source or in holdover
Device related information
    Age of components (oscillator 140, etc.)
    Vendor reported max/min tolerance ranges for different values for specific model/revision
    Max/min drift
    Max/min operational temp range
    Max/min freq stability
    Max/min free-run accuracy
    Long term stability
    Short term stability The determined reliability may be compared with a reliability threshold (step 324) to determine whether or not the reliability requirements (e.g., threshold) for the application 148 are satisfied (step 328). As noted above, different applications 148 may have different reliability requirements and, therefore, may apply different reliability thresholds to determine if time information is sufficiently reliability for use by the application 148. If the application 148 determines that the reliability does not meet the reliability threshold, then the associated time information may be discarded (step 332). For instance, if the PHC 120 was disciplined in temperatures that were too hot or too cold, then time information obtained from the PHC 120 may be discarded or a correction factor may be applied. As another example, if the PHC 120 has not been disciplined within a predetermined amount of time (e.g., within the last X seconds or Y milliseconds), then the time information may be discarded.

On the other hand, if the reliability threshold(s) are satisfied, then the application 148 may keep the time information (step 336) and use the time information within the application 148 (step 340). For example, the application 148 may retain the time information and make one or more routing decisions based on the time information. As another example, the application 148 may perform one or more computational tasks using the time information only if the time information is determined to be sufficiently reliable.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A computing device, comprising:
an interface that receives time information from a Precision Time Protocol (PTP) Hardware Clock (PHC) of a network device along with contextual metadata associated with the time information;
a processor; and
memory coupled with the processor, wherein the memory comprises at least one application that is executable by the processor and, upon execution by the processor:
analyzes the contextual metadata associated with the time information; and
determines, based on the contextual metadata, whether the PHC meets a reliability threshold, and wherein the contextual metadata comprises an oscillator temperature variation of the network device.

2. The computing device of claim 1, wherein the at least one application, upon execution by the processor, determines a reliability of the PHC based on a context in which the PHC is disciplined.

3. The computing device of claim 2, wherein the at least one application, upon execution by the processor, discards the time information received from the network device upon determining that the reliability of the PHC fails to meet at least the reliability threshold.

4. The computing device of claim 1, wherein the contextual metadata further describes an operational change of the network device.

5. The computing device of claim 1, wherein the contextual metadata further describes an elapsed time since the PHC of the network device has last been disciplined.

6. The computing device of claim 1, wherein the contextual metadata is received in a packet that also contains the time information.

7. The computing device of claim 1, wherein the contextual metadata is received in a first packet and wherein the time information is received in a second packet.

8. The computing device of claim 1, wherein the at least one application, upon execution by the processor, makes a routing decision based on the time information and based upon a context in which the PHC is disciplined meets at least one contextual criterion.

9. The computing device of claim 1, wherein the time information describes at least one of time, frequency, and phase.

10. A network device, comprising:
a Precision Time Protocol (PTP) Hardware Clock (PHC); and
an interface that transmits, to a computing device, time information derived from the PHC along with contextual metadata that enables an application of the computing device to determine, based on the contextual metadata, whether the PHC meets a reliability threshold, wherein the contextual metadata comprises an oscillator temperature variation of the network device.

11. The network device of claim 10, wherein the time information and the contextual metadata are encoded together.

12. The network device of claim 10, wherein the time information and the contextual metadata are transmitted via the interface via a common packet.

13. The network device of claim 10, wherein the time information is transmitted via a first packet and wherein the contextual metadata is transmitted via a second packet.

14. The network device of claim 10, wherein the contextual metadata further describes an operational change of the network device.

15. The network device of claim 10, wherein the contextual metadata further describes an elapsed time since the PHC has last been disciplined.

16. The network device of claim 10, wherein the time information describes at least one of time, frequency, and phase.

17. A system, comprising:
   a Precision Time Protocol (PTP) Hardware Clock (PHC); and
   an application that receives time information from the PHC along with contextual metadata associated with the time information, analyzes the contextual metadata associated with the time information, and determines, based on the contextual metadata, whether the PHC meets a reliability threshold, wherein the contextual metadata comprises an oscillator temperature variation of a network device.

18. The system of claim 17, wherein the time information and the contextual metadata are received at the application in a common packet.

19. The system of claim 17, wherein the PHC belongs to the network device and wherein the application belongs to a computing device that communicates with the network device via a communication network.

20. The system of claim 19, wherein the contextual metadata further describes at least one of: an operational change of the network device and an elapsed time since the PHC has last been disciplined.

21. The system of claim 17, wherein the time information describes at least one of time, frequency, and phase.

* * * * *